United States Patent
Cole et al.

(10) Patent No.: US 7,075,534 B2
(45) Date of Patent: Jul. 11, 2006

(54) METHOD AND SYSTEM FOR AUTOMATICALLY GENERATING FACTORED APPROXIMATIONS FOR ARBITRARY BIDIRECTIONAL REFLECTANCE DISTRIBUTION FUNCTIONS

(76) Inventors: Forrester Hardenbergh Cole, P.O. Box 1514, Manchester, MA (US) 01944-0860; Steven J. Gortler, Division of Engineering and Applied Science Harvard University, Boston, MA (US) 02138

( * ) Notice: Subject to any disclaimer, the term of this patent is extended or adjusted under 35 U.S.C. 154(b) by 350 days.

(21) Appl. No.: 10/465,055

(22) Filed: Jun. 19, 2003

(65) Prior Publication Data

US 2003/0234786 A1 Dec. 25, 2003

Related U.S. Application Data

(60) Provisional application No. 60/390,572, filed on Jun. 21, 2002.

(51) Int. Cl.
*G06T 15/50* (2006.01)
(52) U.S. Cl. .................. 345/426; 345/427; 345/581; 345/582
(58) Field of Classification Search .............. 345/426, 345/427, 581, 582
See application file for complete search history.

(56) References Cited

U.S. PATENT DOCUMENTS

| 6,532,013 | B1 | 3/2003 | Papakipos |
| 6,593,925 | B1 | 7/2003 | Hakura |
| 6,657,624 | B1 | 12/2003 | Olano |
| 6,765,573 | B1 * | 7/2004 | Kouadio ............ 345/426 |
| 2002/0080136 | A1 | 6/2002 | Kouadio |
| 2003/0030639 | A1 | 2/2003 | Ritter |

OTHER PUBLICATIONS

McCool. M.D., Ang, J., and Ahmad, A., "Homomorphic Factorization of BRDFS for High-performance Rendering," Computer Graphics (SIGGRAPH 2001 Conference Proceedings) pp. 171-178 (Association for Computing Machinery, New York, N.Y.) (2001).*

Press W., Teukolsky, S., Vetterling, W., and Flannery, B., Numerical Recipes in C: The Art of☐☐Scientific Computing, pp. 397-402, 412-420 (2 ed., Cambridge University Press, Cambridge, England) (1992).*

Beers, A.C., Agrawala, M., and Chaddha, N., "Rendering with Compressed Textures," *Computer Graphics* (SIGGRAPH 1996 Conference Proceedings) pp. 373-378 (Association for Computing Machinery, New York, N.Y.) (1996).

(Continued)

*Primary Examiner*—Richard Hjerpe
*Assistant Examiner*—Said Broome

(57) ABSTRACT

A method and a system are presented to generate automatically factored approximations for arbitrary Bidirectional Reflectance Distribution Functions (BRDFs). The method presented extends previous work to include a search over a space of 4D to 2D projections. Each set of projections defines a set of factors, which in turn defines an approximation error. This error is minimized using a conventional multi-dimensional search algorithm. A new representation for the projection functions is presented that allows efficient searching and enables the construction of a full approximation of a BRDF from the set of its optimal factors and the computation of reflectance values for arbitrary viewing angles using the function's full approximation.

3 Claims, 3 Drawing Sheets

OTHER PUBLICATIONS

Foley, J.D., Van Dam, A., Feiner, S.K., Hughes, J.F., Computer Graphics: Principles and Practice, Second Edition in C, pp. 760-771 (Addison-Wesley, Reading, Mass.) (1997).

Fournier, A., "Separating Reflection Functions for Linear Readiosity," Rendering Techniques '95 (Eurographics Workshop on Rendering) pp. 383-392 (Association for Computing Machinery, New York, N.Y.) (1995).

Kautz, J., and McCool, M.D., "Interactive Rendering with Arbitrary BRDFs using Separable Approximations," Rendering Techniques '99 (Eurographics Workshop on Rendering) pp. 281-292 (Association for Computing Machinery, New York, N.Y.) (1999).

Lafortune, E., Foo, S.C., Torrance, K., and Greenberg, D., "Non-Linear Approximation of Reflectance Functions," Computer Graphics (SIGGRAPH 1997 Conference Proceedings) pp. 117-126 (Association for Computing Machinery, New York, N.Y.) (1997).

Lindholm, E., Kilgard, N., and Moreton, H., "A User-Programmable Vertex Engine," Computer Graphics (SIGGRAPH 2001 Conference Proceedings) pp. 149-158 (Association for Computing Machinery, New York, N.Y.) (2001).

McCool, M.D., Ang, J., and Ahmad, A., "Homomorphic Factorization of BRDFs for High-Performance Rendering," Computer Graphics (SIGGRAPH 2001 Conference Proceedings) pp. 171-178 (Association for Computing Machinery, New York, N.Y.) (2001).

Mebis, J.E., *History of the Quaternion Representation Theorem for Four-Dimensional Rotations*, www.xs4all.nl/~plast/So4hist.htm., 2001.

Press, W., Tcukolsky, S., Vetterling, W., and Flannery, B., *Numerical Recipes in C: The Art of Scientific Computing*, pp. 397-402, 412-420 ($2^{nd}$ ed., Cambridge University Press, Cambridge, England) (1992).

Rusinkiewicz, S., "A New Change of Variables in Efficient BRDF Representation," Rendering Techniques '98 (Eurographics Workshop on Rendering) pp. 11-23 (Association for Computing Machinery, New York, N.Y.) (1998).

Eric Lengyel, *Mathematics for 3D Game Programming & Computer Graphics*, pp. 133-179 (Charles River Media, Hingham, Massachusetts) (2002).

* cited by examiner

METHOD AND SYSTEM FOR AUTOMATICALLY GENERATING FACTORED APPROXIMATIONS FOR ARBITRARY BIDIRECTIONAL REFLECTANCE DISTRIBUTION FUNCTIONS

CROSS REFERENCE TO RELATED APPLICATION

This application claims priority from U.S. Provisional Application Ser. No. 60/390,572, filed 21 Jun. 2002, which is incorporated by reference in its entirety and for all purposes into this application.

BACKGROUND OF THE INVENTION

The invention arises out of research in computational theory applicable to methods for rendering the reflection of light in graphics images processed by commercially available computer hardware. Real time graphics applications have used very unrealistic reflection approximations, and the limitations of current hardware have precluded the use of more general functions that are capable of approximating the behavior of materials more accurately. Approaches to solving this problem using factorization techniques have required user input, yielded results that can not be shown to be optimal, or demonstrated other shortcomings. A need exists, therefore, for an automatic method that produces better results.

SUMMARY OF THE INVENTION

The invention responds to the need for optimal approximations of functions that accurately represent the reflectance of light and can be used for real time computer graphics rendering applications. Methods and systems for automatically generating factored approximations for arbitrary bidirectional reflectance distribution functions are described along with illustrative, non-limiting implementations for which various equivalents are possible or of which various modifications might be made.

As an example, in accordance with one preferred embodiment, a method is described for automatically generating factored approximations for an arbitrary reflectance distribution function that includes the steps of (1) selecting an initial set of projections and textures; (2) establishing a search space; (3) searching the space for a set of optimal factors of the function; (4) building a full approximation of the function from the set of optimal factors of the function; and, (5) computing reflectance values for arbitrary viewing angles using the full approximation of the function. The invention avoids user involvement and produces factorizations that approach the optimal solution.

DETAILED DESCRIPTION

Figure 1:
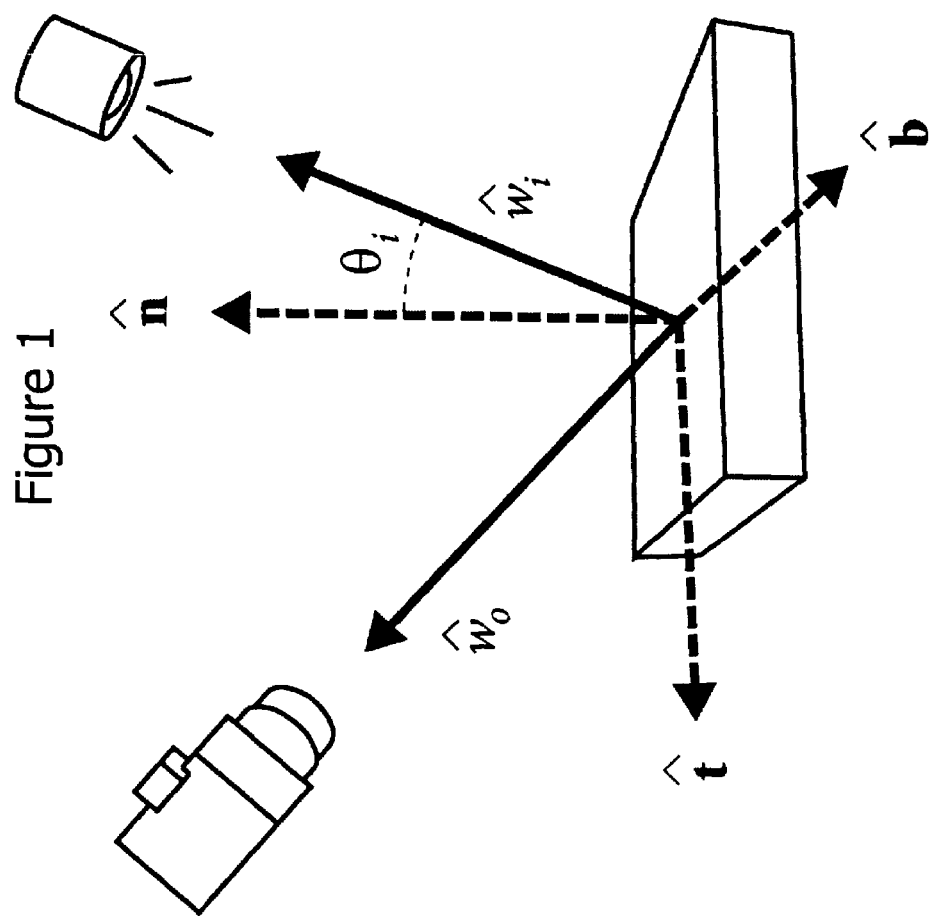
FIG. 1 illustrates the geometry of the reflection equation.

The accurate and efficient modeling of the movement of light as it travels from its sources to objects and on to the eye of an observer is a basic problem in computer graphics and related technology. An integral part of the solution to this theoretical and practical problem is a method for representing the interaction of light with various materials. Every physical material reflects light in a characteristic way, and it is the uniqueness of a material's characteristic reflection that enables an observer to discern the difference between, for example, paper and plastic. A material's reflection information can be captured and represented by a special function called a Bidirectional Reflectance Distribution Function or BRDF. During the process of rendering a computer graphics image, a BRDF can be used to determine the appearance of a material under varying viewing and lighting conditions.

Standard real time graphics applications have used very unrealistic reflection approximations to compute the values required to render an image. Of these known approximations, the theoretically and empirically unsuitable Phong equation is the most common. The use of general BRDFs, which are capable of approximating the behavior of real materials to a high degree of accuracy, can increase the visual realism of a scene significantly. Unfortunately, current graphics hardware is not designed to facilitate rendering with full BRDFs.

A full BRDF may be formulated as either a closed-form function or a lookup table. Current graphics hardware can not evaluate complex functions during rendering, so a closed form representation is unworkable. Hardware acceleration of BRDFs has thus focussed on the lookup table formulation, but that formulation has two significant drawbacks: a BRDF lookup table is typically very large, and the format of the data is not well suited to use in hardware.

The development of methods of approximating a full BRDF by a set of factors is one approach to overcoming these difficulties. The approximation of a BRDF table by a set of factors reduces data storage requirements significantly. At the same time, a data format is created that is more suited to the capabilities of current graphics hardware. Given a large enough number of factors, any BRDF can be approximated to an arbitrary degree of accuracy. To make a factorization useful, however, the BRDF must be approximated acceptably by a small number of factors. When such a shortened series of factors is employed, it is preferable to be certain that the approximation is as good as possible, i.e., to prove that the first k factors constructed by the method's algorithm are indeed the optimal k factors for that BRDF. One constraint on this approach is the theoretical limitation that the results of some factorization schemes can not be proven to be optimal.

Schemes are known that solve some of the practical difficulties of previous representation methods. The most practical of these schemes do not, however, permit proof that their structures are optimal. A prime example of such a scheme is based upon a combination of "projection functions" and "texture functions," terms that we define subsequently. The texture functions are found automatically, but the projection functions are arbitrary and selected manually. It is therefore impossible to prove that a given set of k projections represents the optimal set of k projections. This prime example also does not provide an algorithm for adapting its set of selected projections to an arbitrary BRDF. In order to select effective projections, prior analysis of the structure of a BRDF is necessary.

Our invention improves upon these known schemes by creating a method that searches automatically for optimal projections. Our method accomplishes several goals:

(1) it reduces factorization approximation error;
(2) it provides greater confidence that the selected factorization is optimal; and, (3) it reduces the amount of user input required to create an effective BRDF factorization.

In order to describe our invention and its preferred embodiments, we first review basic BRDF concepts and previous factorization work. We then present an overview of our algorithm and its capabilities and restrictions, including the definition of the "projection search space." We proceed to provide more detailed information to enable the implementation of the invention.

Definition and Use of a BRDF

For an opaque, non-emitting object, the color and appearance of its surface depends on the quality of the light reflected from it. The quality of this light depends on several things: the position of the observer and the position of light sources relative to the surface, the material of the surface, and the intensity and color of the light shining on the surface. The dependence on position of viewer and light can be easily observed: hold a book directly up to a light, and its cover appears bright; turn the book at an angle, and the cover becomes dimmer.

The amount of light reflected by almost all materials varies with the wavelength (color) of the light. At its simplest, a BRDF holds the reflectance properties of one material for one specific wavelength of light. Sophisticated BRDFs are made up of many channels, each holding the reflectance value of the material at a certain wavelength of light. Rendering with a wide range of reflectance values is called full-spectrum rendering and generates the most convincing imagery. Full-spectrum rendering is slow, however, so it is conventional to combine every wavelength near red into one value, every wavelength near green into one, and every wavelength near blue into one. It turns out that handling only RGB (Red-Green-Blue) works fairly well since most real world light sources emit a broad spectrum, and most real world materials reflect a broad spectrum. Only in special cases, such as simulated fluorescent lighting, is the adjustment very noticeable. The preferred embodiments of the invention use RGB BRDF functions although we generally refer only to a single value in this description. Handling RGB values is essentially handling three BRDFs in parallel.

Two informal terms are commonly applied to describe the reflection properties of real world materials: diffuse reflection and specular reflection. Diffuse reflection refers to the dull reflections of most objects, what we might commonly refer to as their color. Diffuse reflection does not depend on the viewing direction. A tennis ball, for instance, possesses almost solely diffuse reflectance: it looks about the same green from any direction under constant lighting conditions. Specular reflectance refers to the mirror-like reflections of shiny surfaces. Specular reflectance varies depending on the viewing direction and peaks when the direction of observation equals the direction of reflection. Most materials have a mixture of both diffuse and specular reflection properties. The shiny hood of a yellow car is an example. The car looks yellow no matter where one stands, i.e., the car reflects yellow light diffusely. At the same time, the glint of the sun off the car's hood is visible only from a certain angle, which is to say that the hood has a bright specular reflection. The BRDF of the car has a relatively constant and low value for all combinations of directions where the outgoing direction is not close to the reflection direction. Where the outgoing direction is close to the reflection direction, the value of the BRDF jumps because of the increased amount of light passing in the reflection direction. This characteristic of shiny BRDFs is called the specular peak and presents a problem that our invention must accommodate.

It is important to note that the division of reflection into diffuse and specular components is arbitrary and not based upon the physical reality of light reflection. The division is simply a very effective way to describe the reflection properties of most real world materials. Known BRDFs can be approximated well by attempting to fit the diffuse reflection component and the specular reflection component separately.

"Radiance" is a general term for the power of light travelling in a certain direction. The power of light reflecting from a surface point x towards the eye is the radiance from x in the outgoing direction $\hat{\omega}_o$, denoted $L_o(x \to \hat{\omega}_o)$. The radiance x from an incoming direction $\hat{\omega}_i$ is denoted $L_i(\hat{\omega}_i \to x)$. For a given incoming radiance $L_i(\hat{\omega}_i \to x)$, the power of the light per unit area of the surface will vary depending on the orientation of the surface. A surface tilted away from the incoming direction will receive less power than one directly facing the surface. We call the power of the light per unit area of the surface from an incoming direction $\hat{\omega}_i$ the "irradiance" in direction $\hat{\omega}_i$. Usually, the irradiance of the surface directly determines how bright it appears. To obtain a measurement of the total light striking a surface, we integrate the irradiance over all incoming directions.

The relationship between light hitting and light reflecting from a surface can be formalized by the following equation, to which we refer as the "reflection equation":

$$L_0(x \to \hat{\omega}_o) = \int_\Omega L_i(\hat{\omega}_i \to x) f(x, \hat{\omega}_i, \hat{\omega}_o) \cos\theta_i d\hat{\omega}_i$$

The geometry of the reflection equation is shown in FIG. 1. Light hits the surface at x from the incoming direction $L_i(\hat{\omega}_i \to x)$ and leaves the surface along the outgoing direction $L_o(x \to \hat{\omega}_o)$ (toward the camera). The equation expresses the total radiance leaving point x along direction $\hat{\omega}_o (L_o(x \to \hat{\omega}_o))$ as the integral of the light hitting x ($L_i(\hat{\omega}_i \to x)$) from all possible incoming directions $\hat{\omega}_i$ over the hemisphere $\Omega$. The integral has three components: the incoming radiance term L, the cosine geometry term, and the reflection term $f$.

It is necessary to convert the incoming radiance measurement to an irradiance measurement before integrating. The irradiance in direction $\hat{\omega}_i$ is the radiance $L_i(\hat{\omega}_i \to x)$ multiplied by the cosine term $\cos\theta_i$. $\theta_i$ is the incident angle, the angle between $\hat{\omega}_i$ and the surface normal $\hat{n}$. The more the surface tilts away from the source (as $\theta_i$ goes to $\pi/2$), the more the surface appears foreshortened from the light's position, and the lower the irradiance on the surface. With some simple geometry, it is apparent that this effect is determined by the cosine of the incident angle $\theta_i$. The irradiance is maximum when the light is shining directly down on the surface and goes to zero as the incident angle goes to $\pi/2$ as the light increasingly grazes the surface. Note that $\hat{\omega}_i$ will always lie in the hemisphere centered on $\hat{n}$, so the cosine will never be negative. This condition results from our assumption that light can not reach the surface from behind it.

The reflection term $f$ is the Bidirectional Reflectance Distribution Function or BRDF. The BRDF relates the incoming irradiance to the outgoing radiance for each pair of directions $\hat{\omega}_i$ and $\hat{\omega}_o$. The value of the BRDF for an incoming direction $\hat{\omega}_i$ and an outgoing direction $\hat{\omega}_o$ is the ratio of the outgoing radiance to the incoming irradiance for those two directions. It is a scalar value in the range $(0, \infty)$. The range of the BRDF extends to infinity because it is used inside an integral and may be, for example, a delta function. Since we place the cosine geometry term outside of the BRDF function $f$, the BRDF depends solely on the physical properties of the material of the surface.

The directions $\hat{\omega}_i$ and $\hat{\omega}_o$ are assumed to be specified in a frame aligned with the surface. In the standard surface frame the normal $\hat{n}$ lies on the z-axis, the surface tangent vector t lies on the x-axis, and the surface binormal $\hat{b}$ lies on the y-axis. With the exception of some extremely simple functions, all BRDFs depend on the orientation of $\hat{\omega}_i$ and $\hat{\omega}_o$ with respect to $\hat{n}$. Only a few BRDFs, however, depend on the orientation of $\hat{\omega}_i$ and $\hat{\omega}_o$ with respect to t and $\hat{b}$. That is, one may rotate two given direction vectors $\hat{\omega}_i$ and $\hat{\omega}_o$ around $\hat{n}$ and the value of the BRDF will not change. A BRDF that does not depend on t and $\hat{b}$ is called isotropic, while a BRDF that does depend on t and $\hat{b}$ is referred to as anisotropic. Most materials have isotropic BRDFs, for example paper, most cloth, and human skin. Materials with anisotropic BRDFs usually have some complex microstructure, such as the grooves in brushed metal. The apparent shininess of such a plate changes considerably when rotated, and this variation can be interpreted as dependency upon the position of t and $\hat{b}$.

The x term passed to the BRDF function $f$ is designed to preserve the generality of the reflection equation by accounting for possible variation in the BRDF based on position. The simplicity of the reflection equation tends to hide the fact that reflection of light is an enormously complex phenomenon that can not be fully described for a point x without regard to the surrounding structure of the surface. Since it has only the two direction parameters, a BRDF can represent only the distribution of light reflecting from a single point on a locally flat surface. Many materials are opaque and smooth on a large scale, however, and these materials can be modelled very successfully with a single BRDF. Depending on the accuracy required, even complex objects such as a grass lawn can be considered smooth on a large scale. In one embodiment of the invention, we have one BRDF for each material, and the position on the surface is irrelevant. Suppressing the x and writing the BRDF as $f(\hat{\omega}_i, \hat{\omega}_o)$ improves readability.

Theoretical and Measured BRDFs

As we have mentioned, a BRDF $f(\hat{\omega}_i, \hat{\omega}_o)$ can be one of two types: a closed-form function or a table of measured data. Closed-form functions are generally derived from some physical theory that describes how light reflects from a surface. These functions vary in their complexity. Known formulations include the Blinn-Phong representation, which is a modification of the original Phong formulation and the simplest theoretical model in common use. This formulation has very little basis in theory or empirical evidence, but can passably model some materials (plastics in particular). Many other models, more theoretically and empirically reasonable, are known to the art. Prominent examples include an early general model of reasonable complexity by Torrance and Sparrow, a complex model for anisotropic reflection by Poulin and Fournier, and more recent general models by Ward and Lafortune et al.

It is relatively easy to develop a theoretical model for simple materials such as plastic and smooth metal, but more complex materials such as leather and velvet present a challenge. The difficulty results from the fact that organic materials have a very complex microstructure that is hard to simulate in theoretical terms. In such cases, actually measuring the light reflected by the material itself can be superior to creating a complex closed-form function. A BRDF created in this way is called a measured BRDF.

Known to the art as a method of creating a measured BRDF is the fabrication of a sphere of the material to be measured and then moving a single light source and camera around it in order to register a color for a large set of diferrent directions. This procedure generates a table of values, the parameters of which are $\hat{\omega}_i$ (the direction to the light) and $\hat{\omega}_o$ (the direction to the camera). A graphics rendering system can use these data as a lookup table. Measured BRDFs are difficult to use well, however, because noise and other technical difficulties encountered during their capture limit their accuracy. The number of samples captured also varies widely. For example, the Columbia-Utrecht (CUReT) database contains approximately 200 samples in which both $\hat{\omega}_i$ and $\hat{\omega}_o$ are spread across half of a hemisphere. Data from the Cornell graphics laboratory are much denser and include approximately 1500 samples.

BRDFs Used in a Hardware Accelerated Environment

An arbitrary BRDF, theoretical or measured, is a natural representation for a software renderer (raytracer or otherwise). In software, we can trivially find the incoming and outgoing directions from the rendered surface and easily calculate a general function for each sample. For a hardware accelerated rasterizer such as those found in contemporary commercial graphics hardware, applying a BRDF is somewhat more difficult. Hardware capable of arbitrary function evaluation is of recent vintage and still quite limited. Because of their simplicity, current graphics hardware has the ability to evaluate the Phong lighting equations. Phong, however, is not satisfactory for most materials. Graphics hardware does have sophisticated lookup table support in the form of "texture mapping," that is, the application of a "texture," which is typically a two dimensional data structure that either stores a bitmap image of a surface or, much less commonly, the results of the evaluation of a BRDF, to a 3D object. The ability to perform fast texture lookups with bilinear filtering is a standard feature of modern graphics hardware. Because of the availability of this hardware, work on hardware acceleration of more sophisticated BRDFs has focussed on packing the functions into texture maps.

Use of a texture map representation requires a BRDF in the form of a discrete function with a certain set of samples. This method is an obvious representation for a measured BRDF, but theoretical models can also be used by pre-evaluating them at a range of directions to generate a set of samples. The disadvantages of representing a BRDF as a discrete function are the same as for conventional texture functions: reconstruction is a problem, as is under-sampling. Both of these difficulties, if not properly handled, can lead to visual artifacts.

BRDF Data Structures

Measured BRDF data are generally collected and stored as an unsorted list of reflectance values and associated direction angles. Each entry in the list contains a color (RGB or full-spectrum) and a set of spherical coordinates for $\hat{\omega}_i$ and $\hat{\omega}_o$. For rendering, however, it is necessary to make lookups of arbitrary directions quickly and, if no BRDF sample is available in the desired direction, to interpolate between the closest samples. To meet this requirement, known practice is to store BRDFs as discrete functions represented by a table indexed by the incoming and outgoing directions. A BRDF in this representation is known as a four dimensional (4D) lookup table. For hardware rendering, however, a BRDF table usually takes the form of a set of 2D textures.

The process of placing an arbitrary measured BRDF in an evenly spaced table is difficult to perform well. BRDF data are often not sampled evenly and may have large gaps at certain angles. Moving the data into a table generally involves a filtering step that can both erase detail and introduce aliasing. In general, it is known that keeping the BRDF data in the original list format as far into any algorithm as possible yields superior results.

BRDF Factorization

A discrete BRDF is naturally stored in a 4D lookup table. While commercially available graphics hardware has long had 2D texture mapping capability, no hardware currently in use has the 4D texture mapping capability necessary to implement this natural representation. Even if 4D texture mapping were implemented, the tables required to hold a measured BRDF would be quite large. At four bytes per sample (single-precision floating point) and a modest sampling rate of approximately twenty samples per radian (or a parabolic parameterization of 64×64 samples), a BRDF requires 64 MB of memory. Since a modern graphics accelerator board has only 64 MB of total texture memory, this storage requirement is prohibitively large. Conventional texture compression algorithms can reduce the space requirement, but not by more than an order of magnitude.

It is known that both of these difficulties can be ameliorated by factoring a BRDF into several smaller functions. A factorization algorithm seeks to find a series of functions $f_1 \ldots f_n$ of lower dimensionality than the BRDF $f(\hat{\omega}_i, \hat{\omega}_o)$ such that, when combined, they approximate $f(\hat{\omega}_i, \hat{\omega}_o)$. Given a large enough number of factors, any discrete BRDF can be approximated to any degree of accuracy. Although theoretically the factors of a BRDF could be three, two, or one dimensional, the preferred embodiments of the invention yield 2D factors. Two dimensional factors are more convenient than 3D factors and require far fewer terms than 1D factors. Factoring $f(\hat{\omega}_i, \hat{\omega}_o)$ into 2D functions has the additional benefit of allowing the factors to be stored in conventional 2D texture maps.

The results of BRDF factorization can be surprisingly good. Theoretically the structure of a BRDF can be highly complex, but in practice most BRDFs are rather simple. The typical BRDF is highly separable, i.e., it can be broken into a few terms, each of which is dependent on only a few of the parameters of the BRDF. This property naturally lends itself to a factorization approach. Only one or two 2D factors, depending on the approximation algorithm, can approximate many BRDFs to a high degree of accuracy. Compared to a naive 4D representation, factorization can reduce the memory footprint of a BRDF by a factor of 100, enough to allow several BRDFs to be stored easily in the texture memory of a commercially available graphics board.

Previous work by Fournier includes a method for factoring BRDFs for radiosity calculations that employs singular value decomposition (SVD) to compute an approximation. Others have used a similar technique to accelerate hardware rendering of BRDFs and developed a method aimed at some of the practical shortcomings of singular value decomposition known as homeomorphic factorization. The major disadvantage of this approach to approximation is that one can not be certain that a specific approximation is optimal. Like the SVD approximation, given enough terms, the homeomorphic approximation will give $f$ to any degree of accuracy. Unlike the SVD, however, it is not possible to prove that the first k terms of the homeomorphic factorization represent the best possible k term approximation of $f(\hat{\omega}_i, \hat{\omega}_o)$. The speed at which the approximation converges is determined by the suitability of the projection functions $\pi_j$ to the particular BRDF chosen, and some extra intelligence must be applied to determine the most effective projection functions. Our invention provides this extra intelligence.

The Algorithm and its Implementation

We start by observing that the best projections for a given BRDF may not be intuitive or easy for a human to find. Even if the basic shape of good projections can be known a priori, the small nuances of BRDF data suggest that adapting good projections slightly may help reduce approximation error. The way we propose to find these superior, tailored projections is by an automatic search through a space of projections.

Our algorithm has an inner and outer loop. The inner loop is essentially the homeomorphic approximation algorithm of McCool, slightly generalized. The inner loop takes a set of projections $\pi_1 \ldots \pi_j$ and finds the set of texture factors $p_1 \ldots p_j$ that, when combined with the projections, best approximates the BRDF. Since the inner loop is deterministic, we can associate an approximation error with each set of projections. The outer loop attempts to find the set of projections that minimizes this approximation error. The most obvious and potentially the most accurate outer loop algorithm is to search simultaneously for J projections, executing the inner loop once for each set that we wish to test. Using this approach, the number of dimensions in our search space increases with each term. The method that we have implemented in the preferred embodiments of our invention is a faster and simpler, but potentially less accurate, greedy method. The following pseudocode sets forth the basic algorithm:

```
Approximate BRDF
    for j from 1 to J
        make guess for projection j
        do
            optimize approx for proj. 1 . . j
            refine guess for proj. j
        while (proj. j can be improved)
    endfor
```

Figure 2:
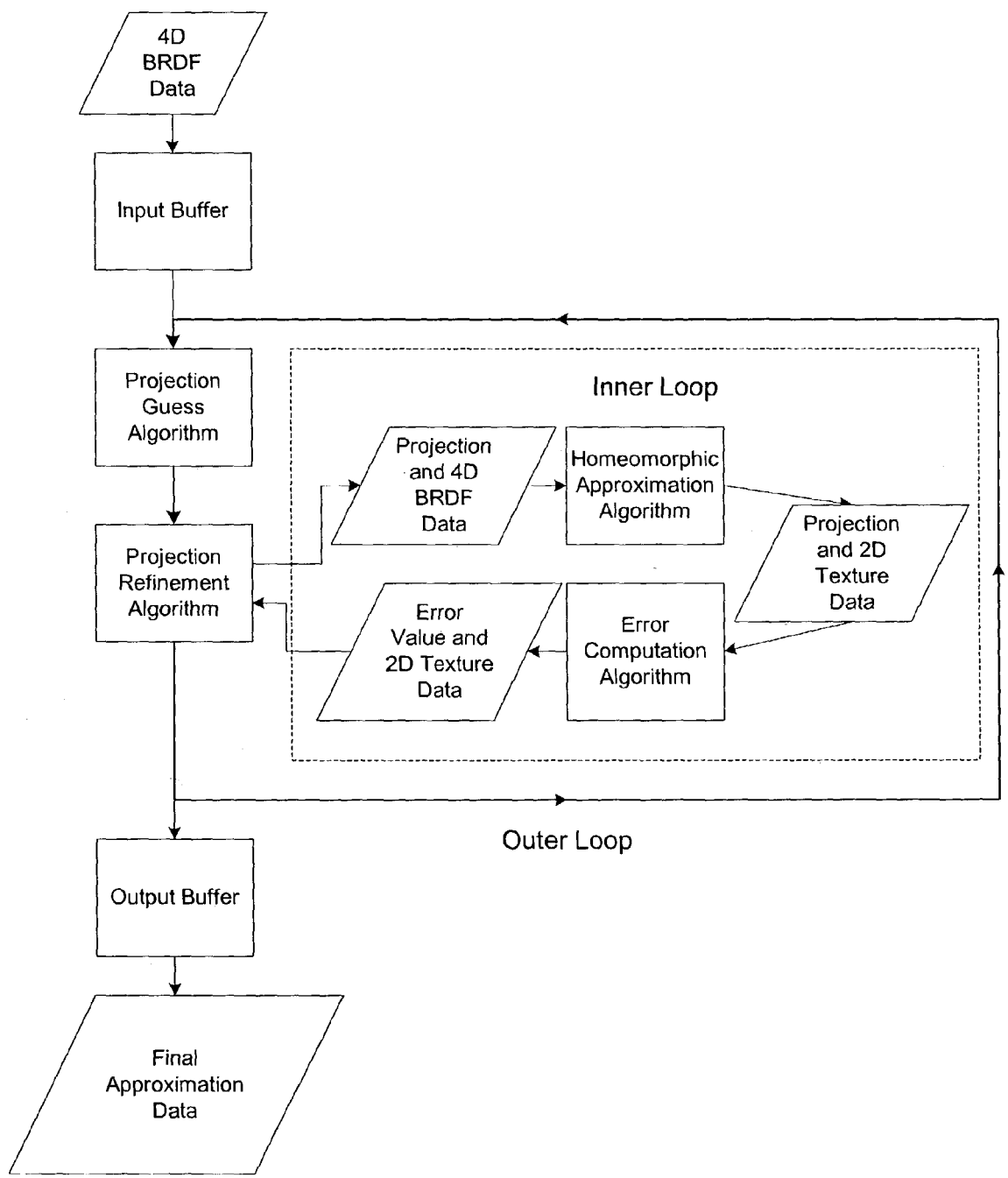
FIG. 2 illustrates the main approximation algorithm.
Figure 3:
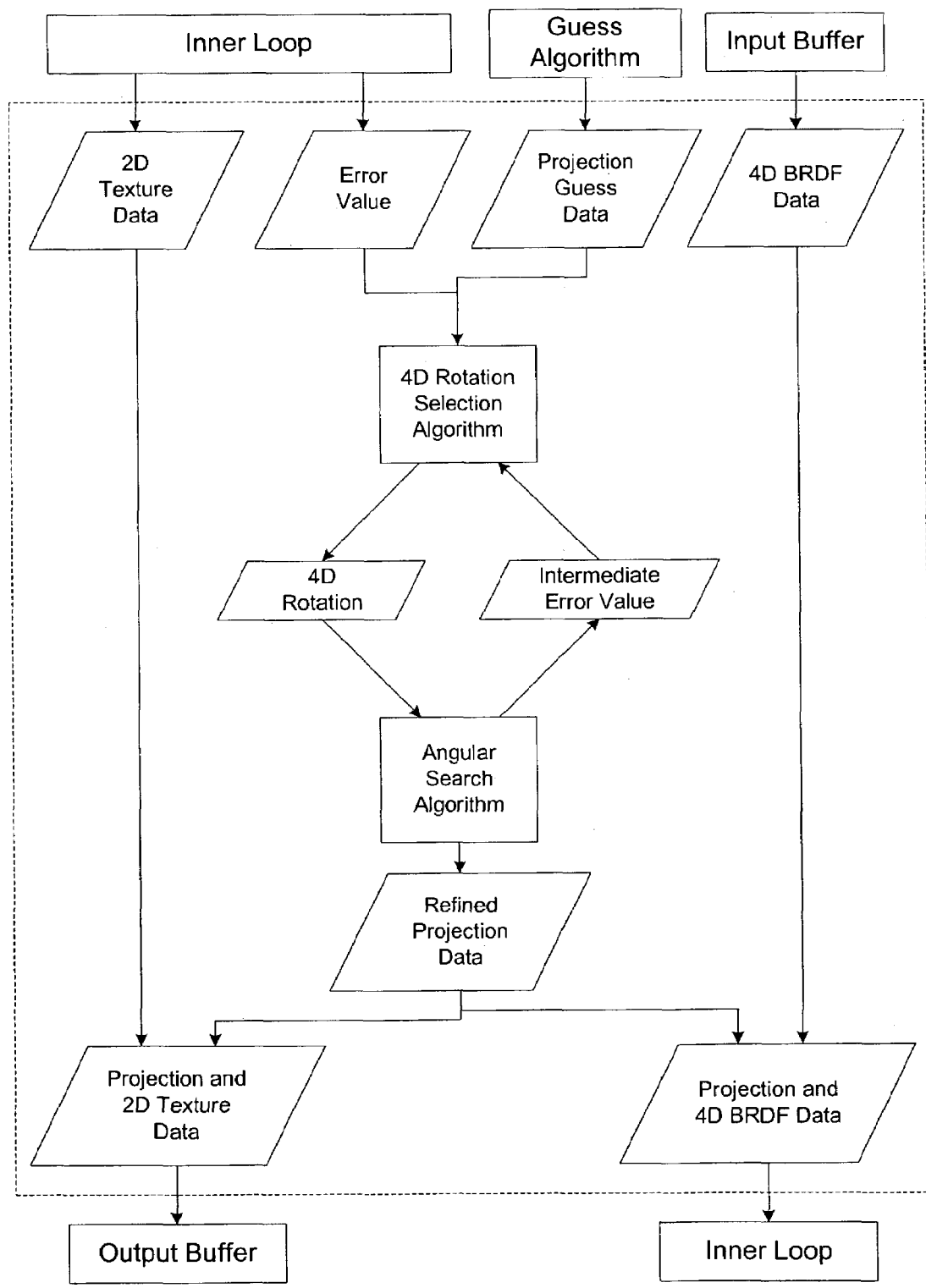
FIG. 3 illustrates the projection refinement algorithm.

FIG. 2 is a block diagram that shows the overall structure of the method. FIG. 3 is a block diagram that shows the structure of the projection refinement algorithm.

Further described, a preferred embodiment searches for one projection at a time, building up J projections incrementally. The outer loop starts on $\pi_1$ and attempts to find the best one term approximation of the BRDF. Once that approximation is found, the routine moves on to $\pi_2$. For $\pi_i$, the algorithm attempts to find the best i term approximation that it can while varying $\pi_i$ and keeping $\pi_1 \ldots \pi_{j-1}$ constant. Commonly, we find that the diffuse component is roughly approximated first, followed by a rough specular component, and then followed by refinements. To enable our algorithm to work, however, a well defined projection search space is required. We next describe the implementation of our search space representation.

In the general form of the preferred homeomorphic factorization, the projections $\pi_j$ can be arbitrary functions from $R^4$ to $R^2$. These unrestricted projections allow excellent flexibility to match the characteristics of particular BRDFs. In order to search for optimal projections, however, it is necessary to be able to manipulate projections easily. In the preferred embodiments of our invention, we establish a specific subset of all projections to serve as the search space of our algorithm.

Our search space of projections P satisfies a few basic conditions, which we now describe. First, an element p∈P should be easily defined with as few values as possible. Known search algorithms are, in general, designed to operate in a vector space, so P should have as many qualities of a vector space as possible. In particular, there should be an easy method of quantifying the difference between p, q∈P and some idea of a direction from p to q. Finally, P should contain only projections that could be reasonably used in a homeomorphic factorization.

In order to satisfy these constraints, the projection search space employed in the preferred embodiments of the invention is restricted to the space of linear projections $p:R^4 \to R^2$, to which we refer as $P_L$. A linear projection $p \in P_L$ can be expressed as a 2×4 matrix. Although $P_L$ is a very easy space to search, it does not satisfy the condition that it contain only elements that are useful for homeomorphic factorization approximation. The preferred embodiments therefore restrict $P_L$ further to the space of orthonormal linear projections, to which we refer as $P_O$. Under an orthonormal projection, the projection image will have the largest area possible inside square textures. Restriction to orthonormal projections does not limit the effectiveness of the algorithm since any projection $p \in P_L$ can be represented by an orthonormal projection $q \in P_O$ followed by a linear transformation. The relative arrangement of points in the image of p and q remains the same. Restricting P to $P_O$ reduces flexibility, but we have found that the algorithm is usually able to accommodate this reduction.

The space of unrestricted linear projections $P_L$ has eight dimensions. $P_O$ has five. The preferred embodiments employ a scheme of our devising to obtain a representation of $p \in P_O$ that comes as close as possible to this theoretical limit of five dimensions. This different representation improves the efficiency of the search algorithm, but, in order to apply a projection, it is necessary to convert back to the 2×4 matrix representation.

An orthonormal projection defines a 2D plane in 4D space. The action of the projection p is to project orthogonally 4D points onto the surface of the plane. This plane can be represented by a 4D rotation and a pair of fixed basis vectors, thus enabling a shift from one projection to any other using only rotation. The space $P_O$ is closed under the operation of rotation since rotation preserves orthogonality and scale.

The number of dimensions in the search space, using this rotational representation, is equal to the degrees of freedom of a 4D rotation, which is six. The rotation representation thus has one more dimension than would be optimal. This extra dimension defines a family of rotations that has no effect on the image of the projection, and the search algorithm ignores it.

The final step in our scheme is to define a representation for a 4D rotation. It is known that an arbitrary 4D rotation R may be represented by the left and right multiplication of unit quaternions, $\hat{S}$ and $\hat{T}$. Given a 4D vector v, we apply the 4D rotation R to v as follows:

$$v' = \hat{S}v\hat{T}$$

where v is treated as a quaternion. The quaternion representation enables the storage and manipulation of eight values per rotation, only two more than the theoretical limit of six. For example, a 4D rotation can be denoted as a duple of unit quaternions:

$$R = [\hat{S}, \hat{T}] = [(0.707, 0, 0.707, 0)^T, (0, 0, 1, 0)^T].$$

The use of this scheme reduces the original search over $P_O$ to a search over the space of two unit quarternions, to which we refer as $Q^2$. $Q^2$ has only six dimensions and thus is almost as concise a space as possible. It also maps entirely onto the space $P_O$. $Q^2$ is a troublesome space to search since quaternions are not linear, but they are sufficiently well behaved for the algorithm.

In the preferred embodiments of the invention, the algorithm avoids costly function evaluations (each function evaluation represents a full evaluation of the algorithm's inner loop, which is a full homeomorphic approximation computation) by increasing the complexity of its outer loop. In the preferred embodiments, the algorithm also avoids interpolating between more than two points in $Q^2$ since quarternion combination is not linear. In the preferred embodiments, the algorithm searches aggressively for local minima, of which $Q^2$ has a relatively small number, and uses a direction set technique along with a Golden Section search, both known to the art. Thus implemented, the algorithm searches $Q^2$ efficiently: on average, the algorithm will converge to a minimum in between two and four iterations through the six directions of $Q^2$ even when random guesses are used.

The preferred embodiments of the invention include a means for solving the very large system of linear equations that results from the inner loop of the algorithm's solving every term of the homeomorphic approximation simultaneously. While this linear system solving means is very similar to known methods, the preferred embodiments of the invention solve only the last n terms of the approximation simultaneously, where n is usually 1 or 2.

We have determined that our invention yields markedly improved results over known methods of approximating BRDFs that are more complex than the classic single specular lobe function. While we have described the preferred embodiments of our invention, it should be apparent to those skilled in the art that other schemes could be adopted or adapted in various ways in alternative embodiments. These alternative embodiments, and modifications of them, are contemplated as falling within the scope of our invention as defined by the following claims and equivalents to them.

We claim:

1. A method for automatically generating factored approximations for an arbitrary reflectance distribution function, comprising the steps of:
   (1) selecting an initial set of projections and textures wherein the initial set of projections and textures consists of
      (a) projections that are functions over a four-dimensional domain and a two-dimensional range and are linear and orthogonal and
      (b) textures that are discrete two-dimensional functions over a two-dimensional finite domain and a one-dimensional range between 0 and 1;
   (2) establishing a search space wherein the search space lies over the space of projections only and consists of the space of four-dimensional rotations;
   (3) searching the space for a set of optimal factors of the function wherein the searching algorithm comprises (a) an outer loop that searches over the search space and performs a four-dimensional direction set search and a one-dimensional golden section search and (b) the inner loop constructs the textures;

(4) building a full approximation of the function from the set of optimal factors of the function wherein the approximation of the function consists of a mathematical series of factors and each factor of the approximation of the function consists of the composition of a projection and a texture; and, (5) computing reflectance values for arbitrary viewing angles using the full approximation of the function wherein the computation of the reflectance values comprises the step of (a) evaluating the approximation of the function using a pair of incoming and outgoing vectors where (b) the vectors are used as indices for the approximation and where the computation of the reflectance values is performed by programmable graphics accelerator hardware.

2. A computer system for automatically generating factored approximations for an arbitrary reflectance distribution function having a processor and a memory unit having stored therein computer logic for a reflectance distribution function computation application, wherein, when the program logic is executed in cooperation with the processor, a method is performed comprising the steps of:

(1) selecting an initial set of projections and textures wherein the initial set of projections and textures consists of (a) projections that are functions over a four-dimensional domain and a two-dimensional range and are linear and orthogonal and (b) textures that are discrete two-dimensional functions over a two-dimensional finite domain and a one-dimensional range between 0 and 1;

(2) establishing a search space wherein the search space lies over the space of projections only and consists of the space of four-dimensional rotations;

(3) searching the space for a set of optimal factors of the function wherein the searching algorithm comprises (a) an outer loop that searches over the search space and performs a four-dimensional direction set search and a one-dimensional golden section search and (b) the inner loop constructs the textures;

(4) building a full approximation of the function from the set of optimal factors of the function wherein the approximation of the function consists of a mathematical series of factors and each factor of the approximation of the function consists of the composition of a projection and a texture; and, (5) computing reflectance values for viewing angles using the full approximation of the function wherein the computation of the reflectance values comprises the step of (a) evaluating the approximation of the function using a pair of incoming and outgoing vectors where (b) the vectors are used as indices for the approximation and where the computation of the reflectance values is performed by programmable graphics accelerator hardware.

3. A computer program product for automatically generating factored approximations for an arbitrary reflectance distribution function comprising computer program logic stored on a computer readable medium that, when executed in cooperation with a computer processor, performs a method comprising the steps of:

(1) selecting an initial set of projections and textures wherein the initial set of projections and textures consists of (a) projections that are functions over a four-dimensional domain and a two-dimensional range and are linear and orthogonal and (b) textures that are discrete two-dimensional functions over a two-dimensional finite domain and a one-dimensional range between 0 and 1;

(2) establishing a search space wherein the search space lies over the space of projections only and consists of the space of four-dimensional rotations;

(3) searching the space for a set of optimal factors of the function wherein the searching algorithm comprises (a) an outer loop that searches over the search space and performs a four-dimensional direction set search and a one-dimensional golden section search and (b) the inner loop constructs the textures;

(4) building a full approximation of the function from the set of optimal factors of the function wherein the approximation of the function consists of a mathematical series of factors and each factor of the approximation of the function consists of the composition of a projection and a texture; and, (5) computing reflectance values for arbitrary viewing angles using the full approximation of the function wherein the approximation of the reflectance values comprises the step of (a) evaluating the approximation of the function using a pair of incoming and outgoing vectors where (b) the vectors are used as indices for the approximation and where the computation of the reflectance values is performed by programmable graphics accelerator hardware.

* * * * *